United States Patent [19]

Spencer et al.

[11] 4,087,681

[45] May 2, 1978

[54] ASYNCHRONOUS TO SYNCHRONOUS CONVERTER

[75] Inventors: John Patrick Spencer, Bellingham, Wash.; Anthony Joseph Torre, Warren, Mich.

[73] Assignee: Schiller Industries, Inc., Troy, Mich.

[21] Appl. No.: 695,290

[22] Filed: Jun. 11, 1976

[51] Int. Cl.² ........................... G06K 7/14; H03K 9/03
[52] U.S. Cl. ........................................ 235/466; 329/106
[58] Field of Search .............. 235/61.11 E, 61.11 D; 329/106, 126; 250/555, 566, 568, 569; 328/111

[56] References Cited

U.S. PATENT DOCUMENTS

| | | | |
|---|---|---|---|
| 3,723,710 | 3/1973 | Crouse et al. ................... | 235/61.11 E |
| 3,854,036 | 12/1974 | Gupta et al. ................... | 235/61.11 E |
| 3,864,548 | 2/1975 | O'Neil, Jr. et al. ............. | 235/61.11 E |
| 3,887,793 | 6/1975 | Goodfinger et al. .......... | 235/61.11 E |
| 4,012,716 | 3/1977 | Herrin ............................ | 235/61.11 E |

*Primary Examiner*—Daryl W. Cook

*Attorney, Agent, or Firm*—Reising, Ethington, Barnard

[57] ABSTRACT

An asynchronous to synchronous converter is disclosed which produces clock pulses in synchronism with data bits of a non-return-to-zero code having a variable data rate. The converter comprises a first bit clock generator which is adapted to produce a first timing signal for the first bit clock pulse of a data pulse which is one or more bits in width. The bit width is measured separately for high level and low level data pulses and the timing signal is generated accordingly. It also comprises a second bit clock generator which produces successive timing signals, one for each additional bit width, according to the maximum allowable number of bits per data pulse. Means are provided for compensating for systematic error in measured bit widths such as caused by ink spread variations. Additionally, means are provided to insert a bit clock pulse in the event of a missing pulse in the bit clock stream. Also, a digital noise rejection means is provided.

8 Claims, 29 Drawing Figures

1

ASYNCHRONOUS TO SYNCHRONOUS CONVERTER

This invention relates to a system for generating clock pulses in synchronism with asynchronous data bits. It is an improvement upon the invention disclosed in Ser. No. 655,368 filed Feb. 5, 1976 by Gerald A. Rynkowski and the disclosure thereof is incorporated herein by reference.

The description of this invention will be given with reference to the disclosure of the aforementioned Ser. No. 655,368; it is to be understood that the improvement features are described below in relation to the Asynchronous to Synchronous (A/S) Converter of Ser. No. 655,368 which is variously referred to below as the "original," "first," or "prototype" A/S Converter.

Figure 8:
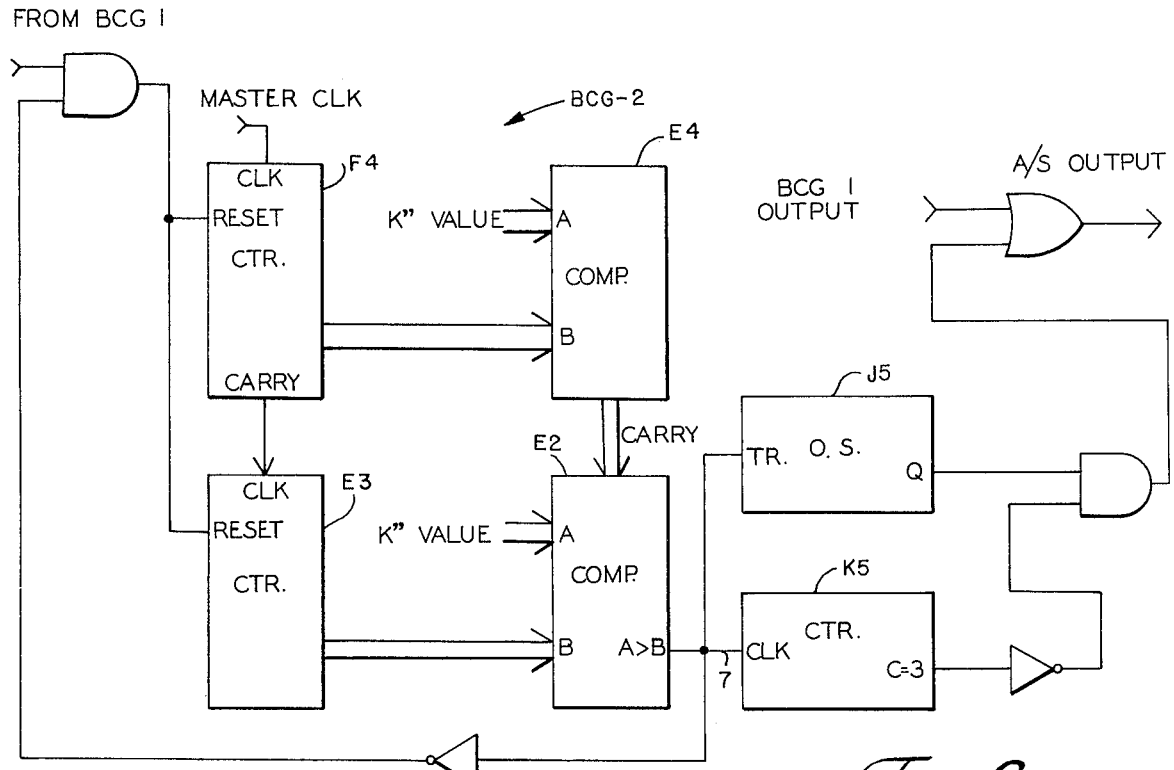
Figure 1:
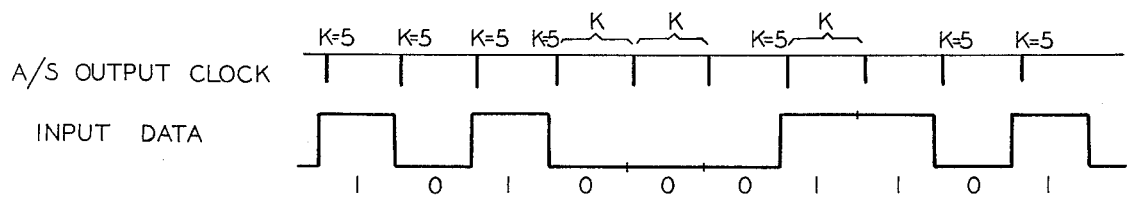
Figure 2:
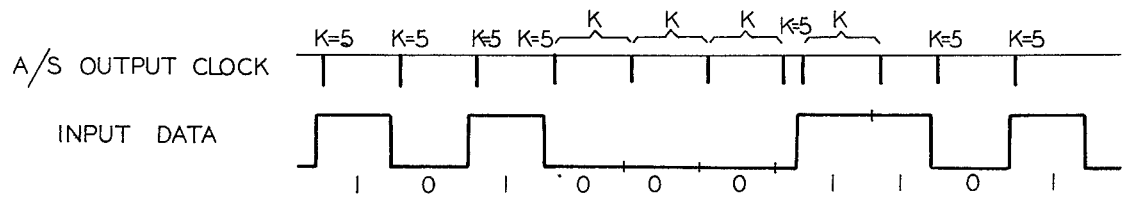
Figure 3:
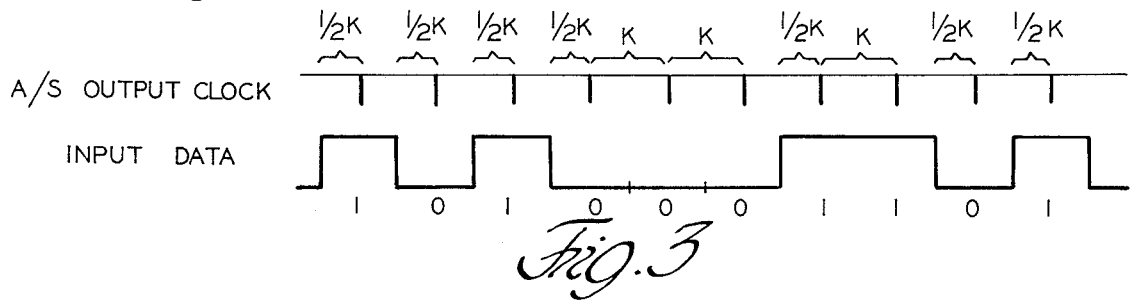
Figure 4:
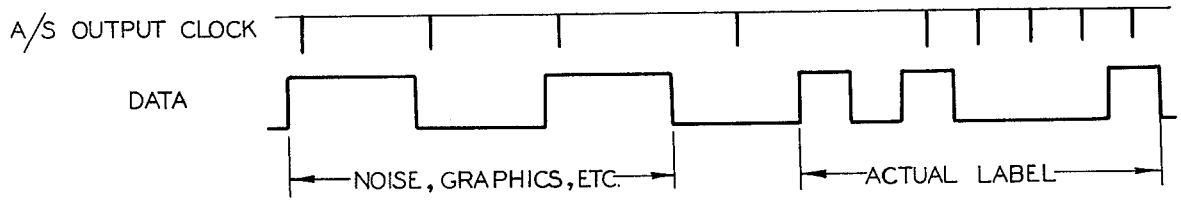
Figure 5:
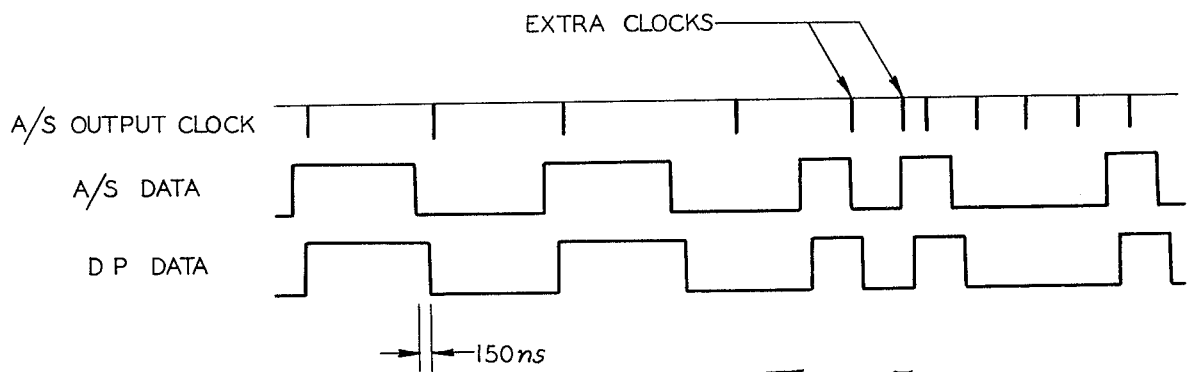
Figure 11:
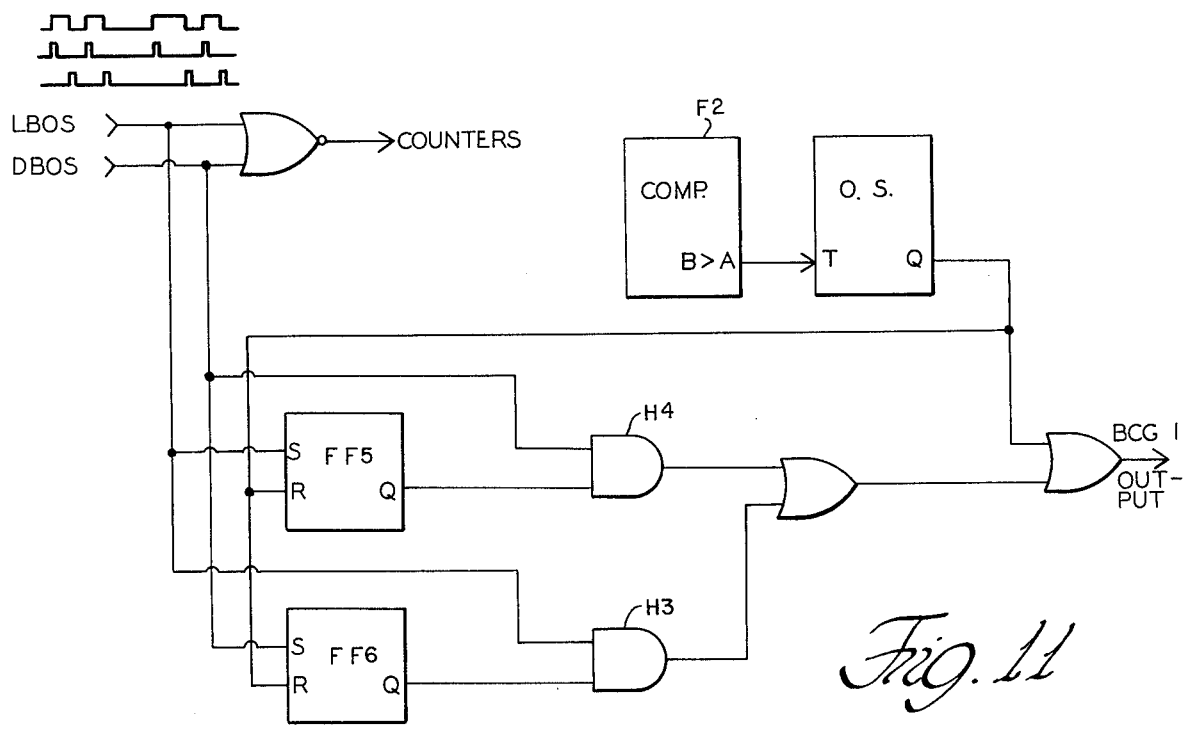
Figure 6:
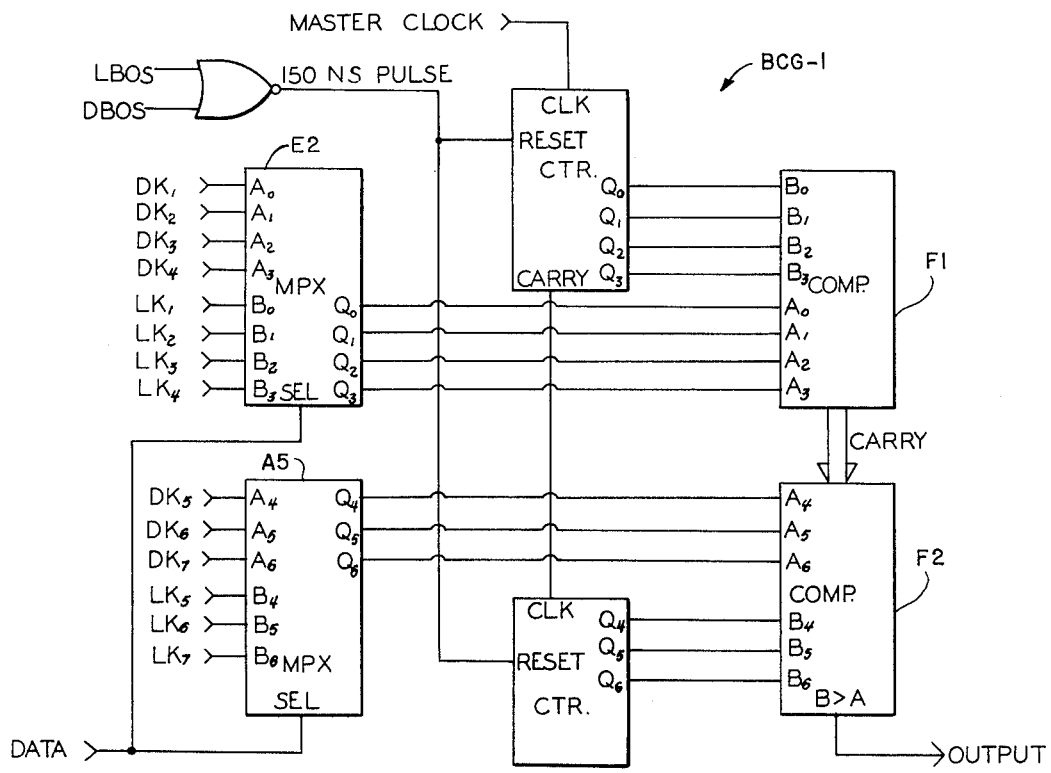
Figure 7:
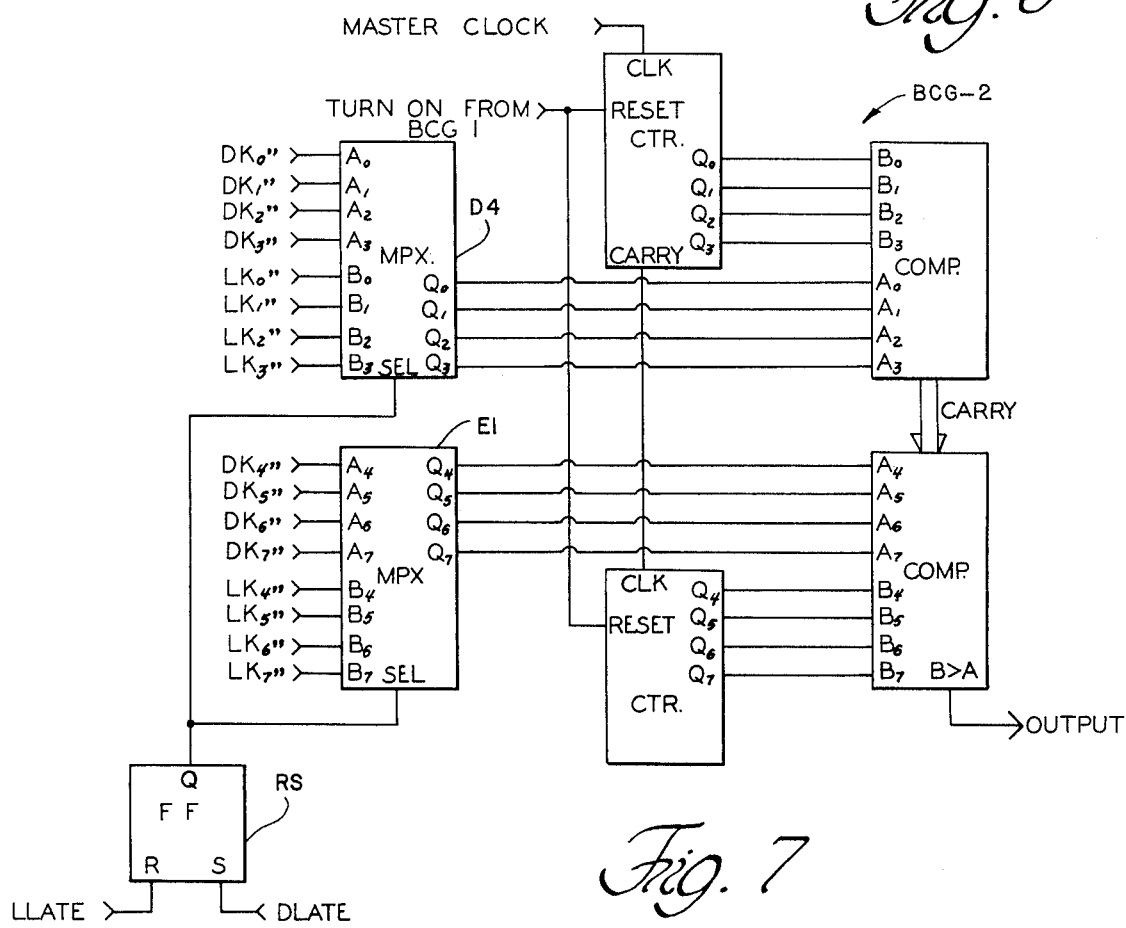
Figure 9:
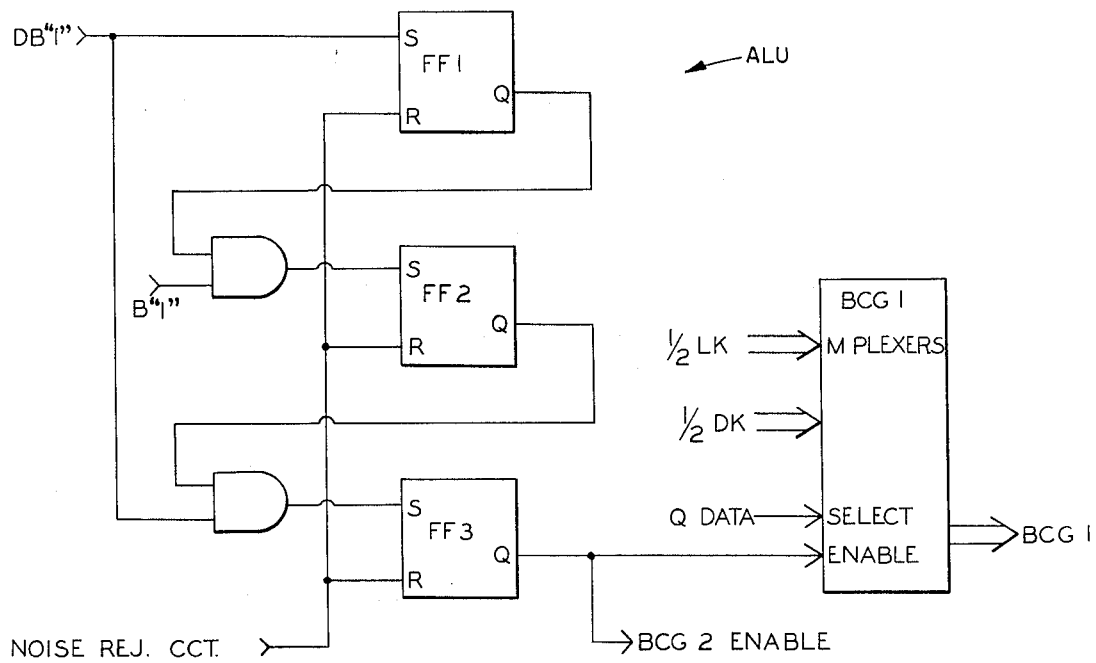
Figure 10:
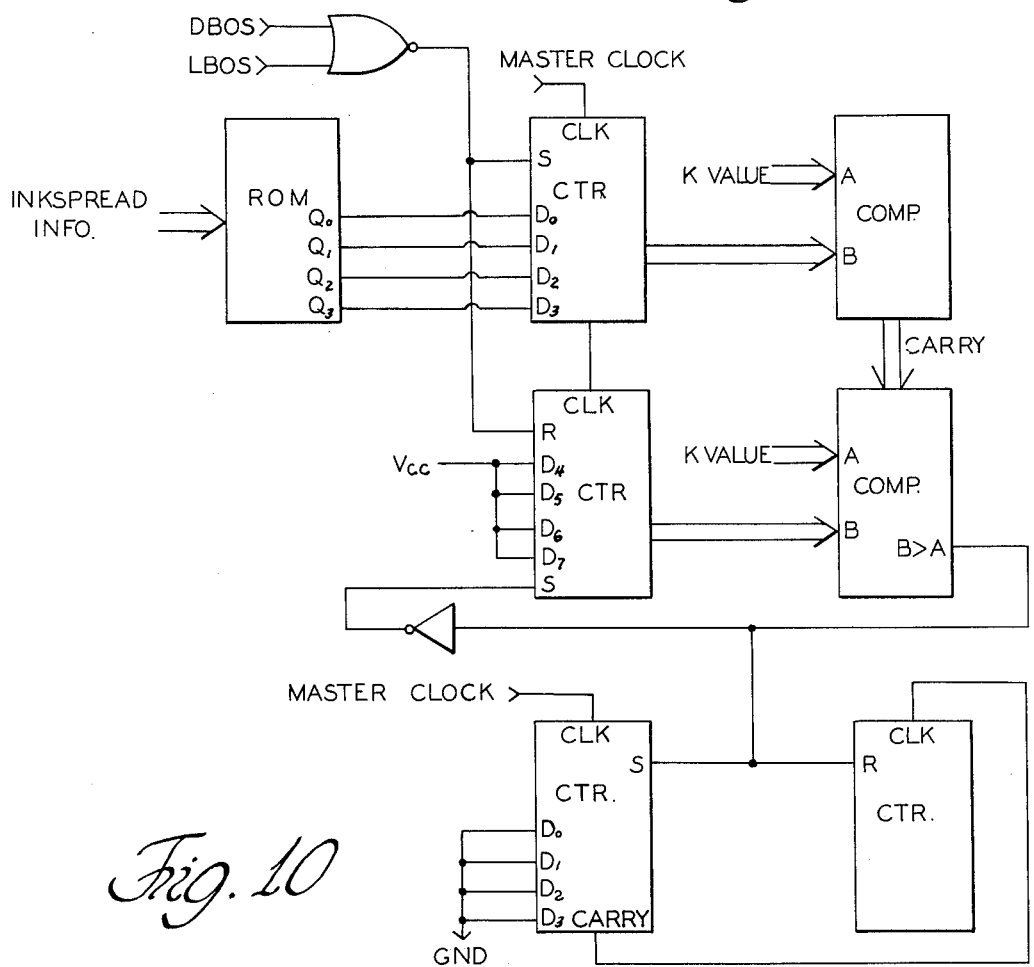
Figure 12:
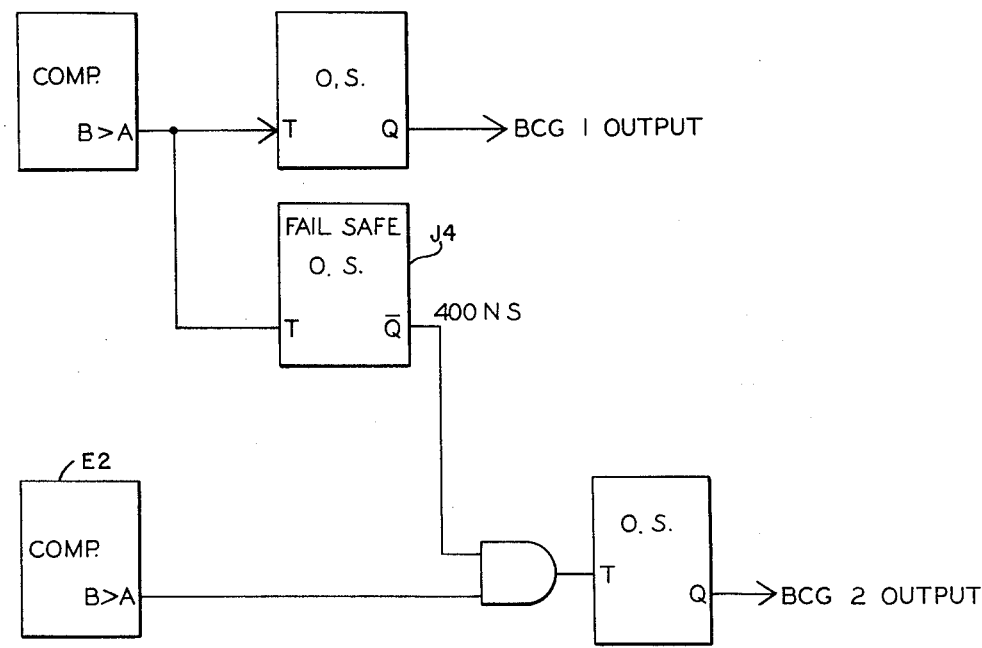
Figure 13:
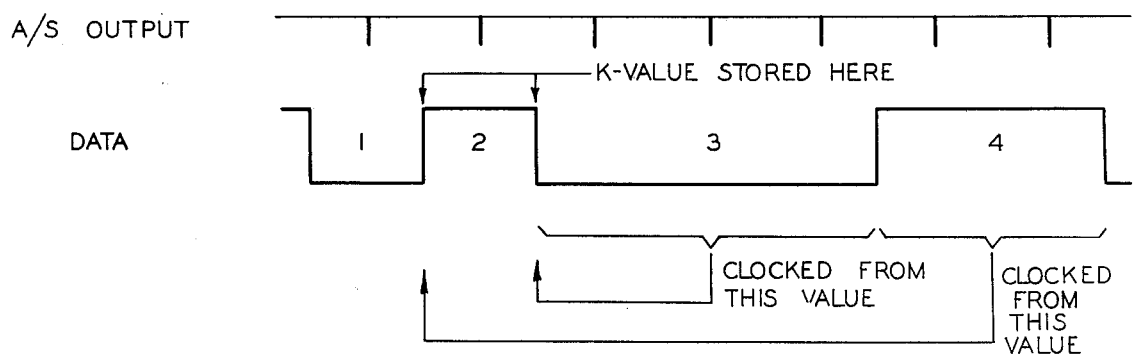
Figure 14:
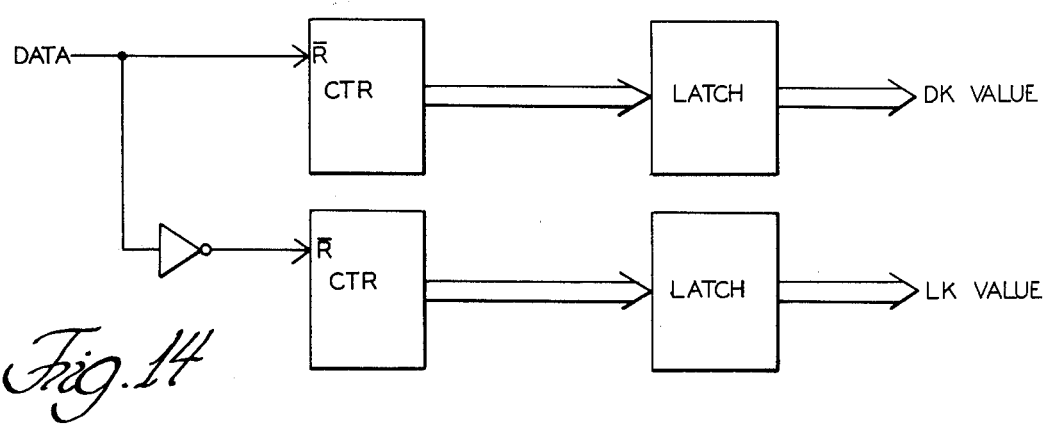
Figure 15:
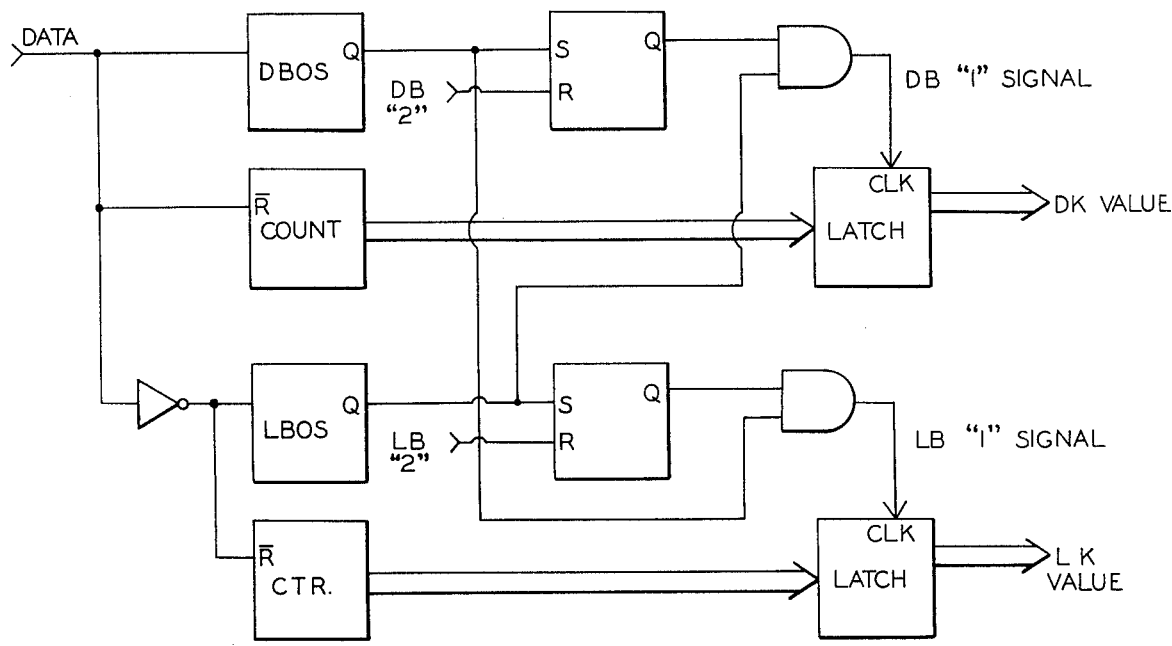
Figure 16:
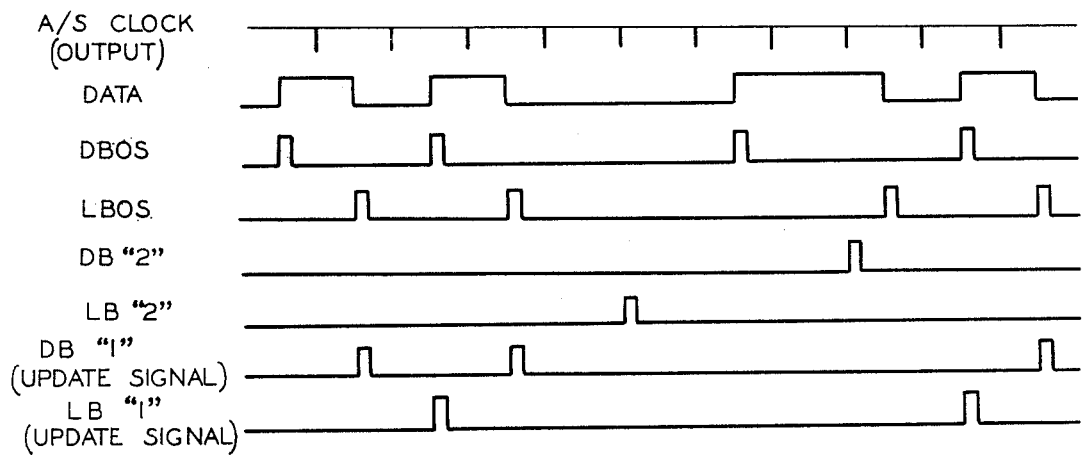
Figure 17:
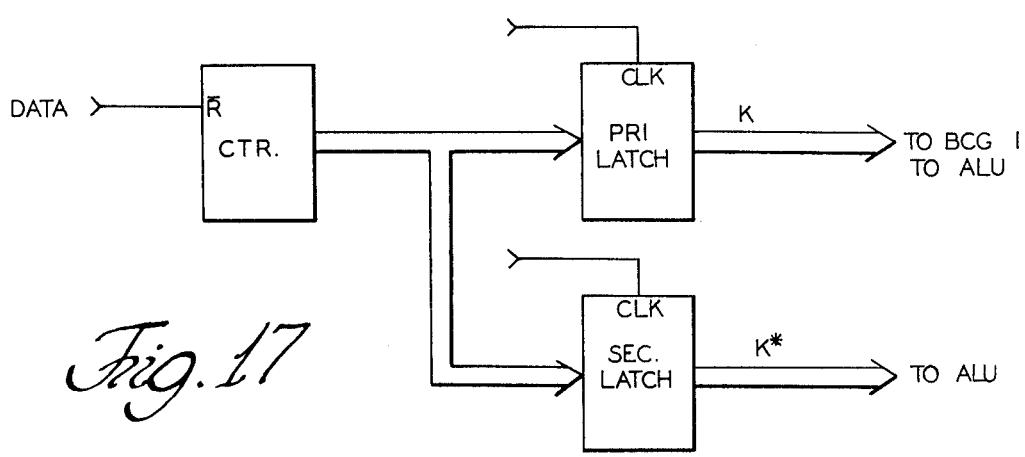
Figure 18:
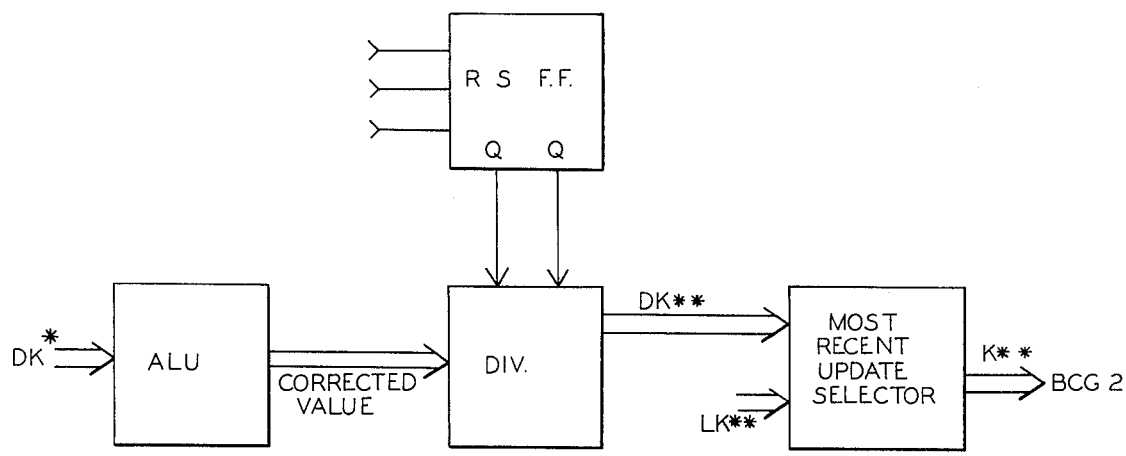
Figure 19:
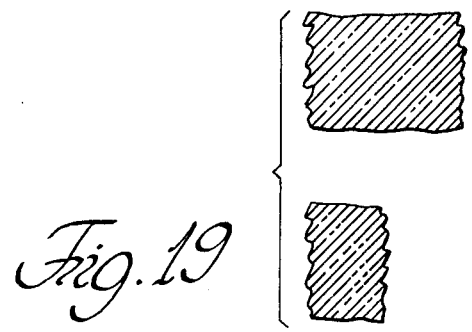
Figure 20:
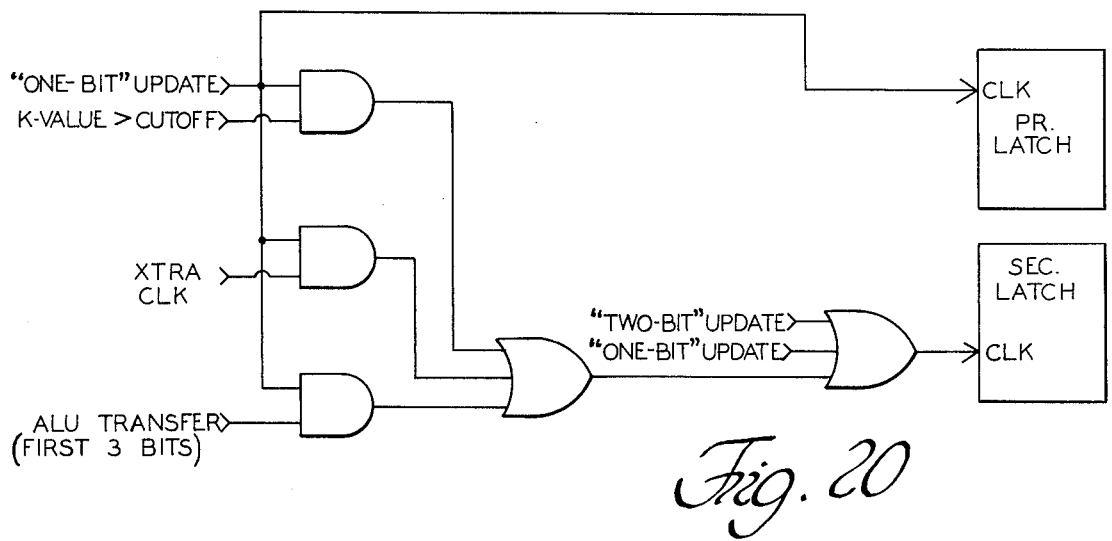
Figure 21:
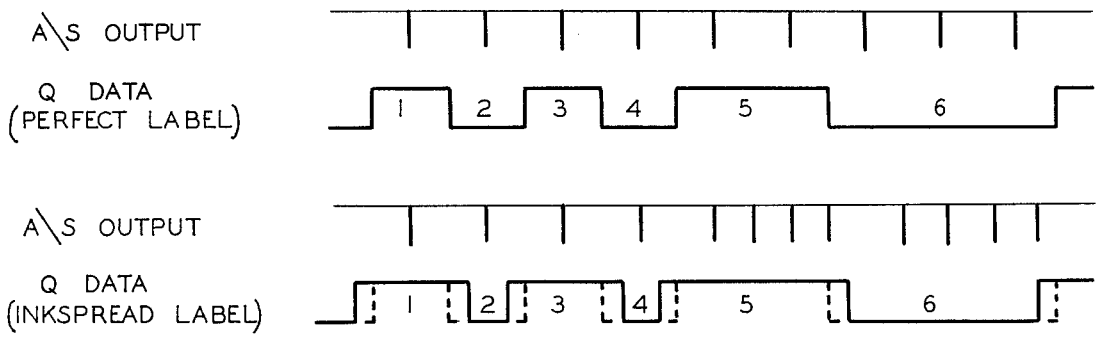
Figure 22:
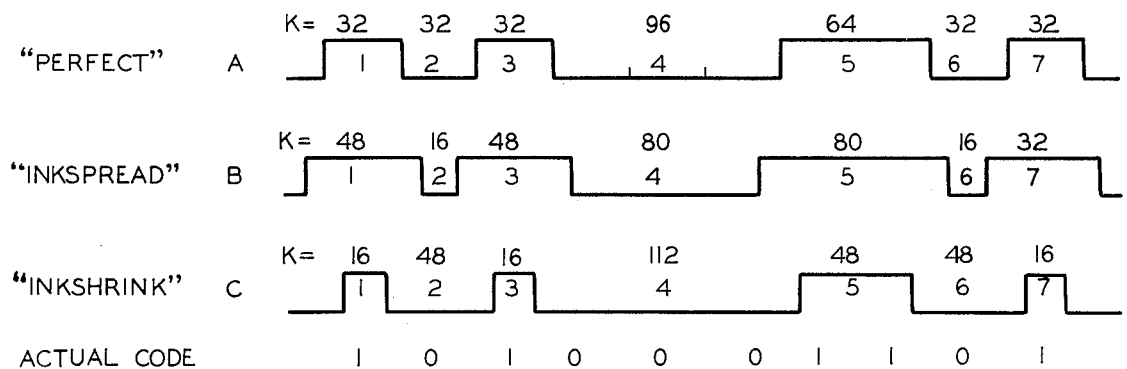
Figure 23:
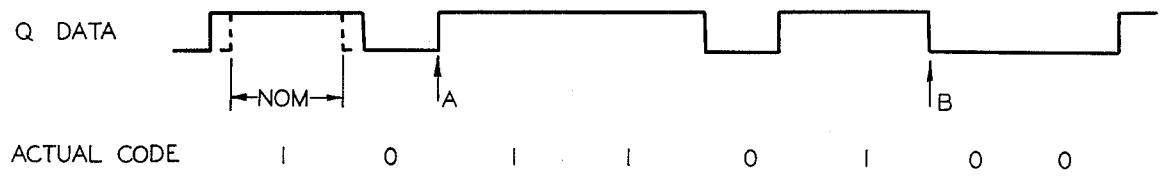
Figure 24:
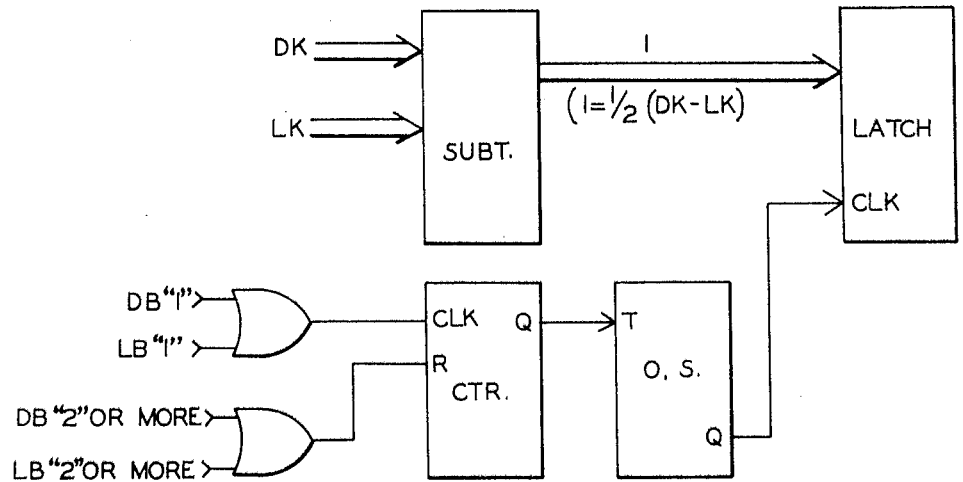
Figure 25:
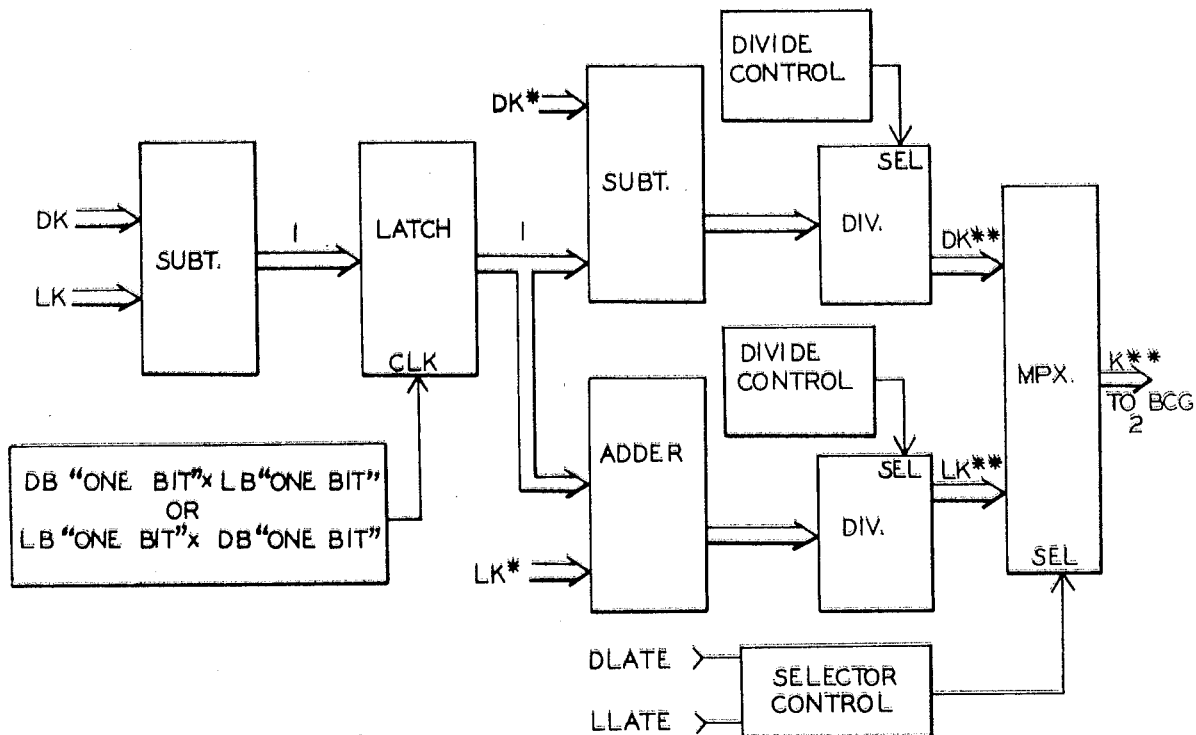
Figure 26:
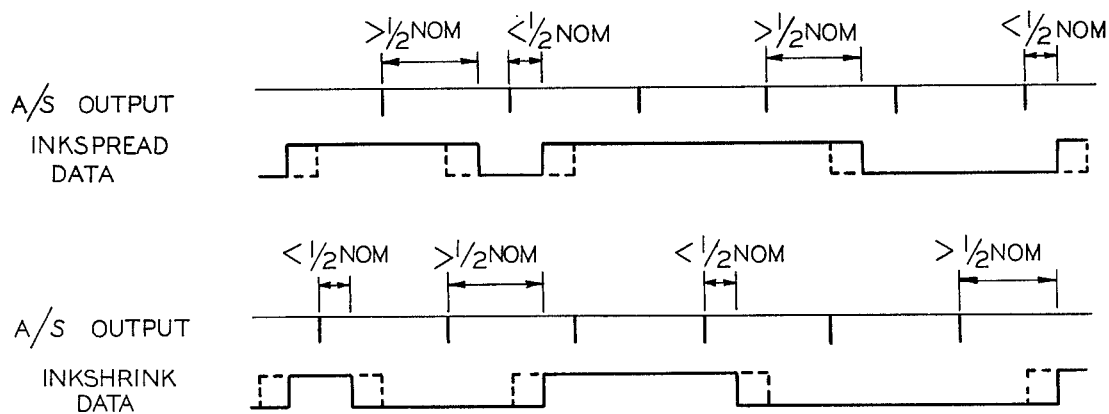
Figure 27:
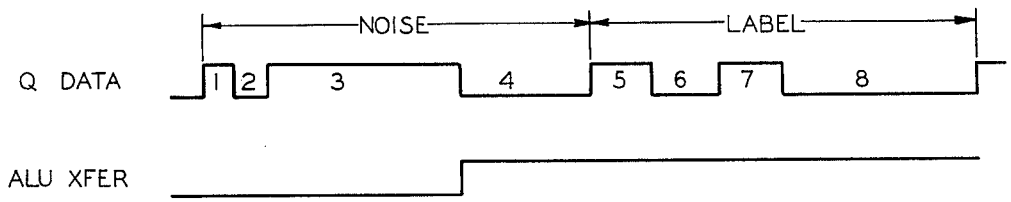
Figure 28:
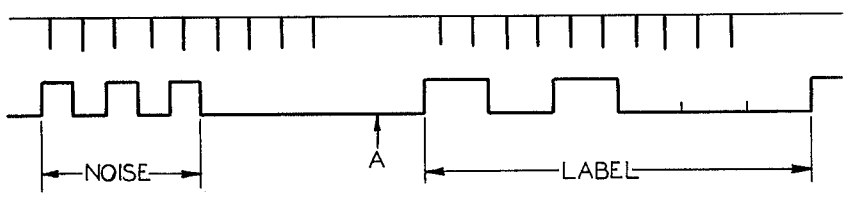
Figure 29:
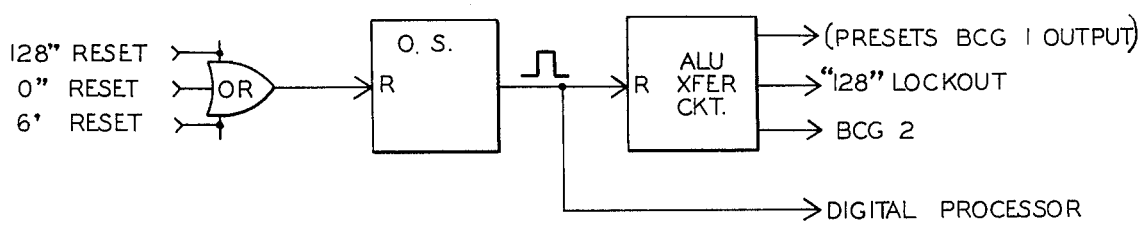

The invention will be described with reference to the drawings in which:

FIG. 1 represents a stream of data and clock signals;
FIG. 2 represents a data signal with clock signal errors;
FIG. 3 shows relocation of the clock signals;
FIG. 4 shows artificial insertion of a clock pulse;
FIG. 5 represents the improved data and clock signal relationship;
FIG. 6 shows the first bit clock generator of this invention;
FIG. 7 shows the second bit clock generator of this invention;
FIG. 8 illustrates the second bit clock generator with recycling;
FIG. 9 shows the ALU transfer circuit;
FIG. 10 shows the bit clock generator system with additional improvements;
FIG. 11 shows an improvement including two R–S latches;
FIG. 12 shows a failsafe circuit;
FIG. 13 shows an example of data and clock pulses in the absence of cross-strobing;
FIG. 14 shows count and latch circuits;
FIG. 15 is a more detailed count and latch circuit;
FIG. 16 is a timing diagram of the count and latch circuit;
FIG. 17 is a simplified diagram of the count and latch circuit;
FIG. 18 is a block diagram of the DK side of the system;
FIG. 19 illustrates printing error;
FIG. 20 is an update decision making circuit;
FIG. 21 represents comparison of an ink-spread label with a perfect label;
FIG. 22 represents a further comparison of a perfect label, an ink spread label and an ink shrink label;
FIG. 23 represents a data signal for illustrating calculation of ink spread;
FIG. 24 is a circuit for calculating ink spread;
FIG. 25 is a circuit for obtaining the corrected K value;
FIG. 26 illustrates errors which may arise in clocking ink shrink and ink spread labels;
FIG. 27 illustrates digital noise in the data stream;
FIG. 28 further illustrates the effect of noise in the data stream, and
FIG. 29 is a block diagram of the digital noise rejection system.

The function of the Bit Clock Generator (BCG) system, as envisioned for the first Asynchronous to Synchronous (A/S) Converter, was to compare a predetermined binary value K with a count using the same time reference, and to produce an output when the count reached this K-value. While this basic concept has been retained, numerous changes have been made in the BCG for reasons of economy in component use, as well as to improve the accuracy of the system.

We will first examine those changes meant to economize the circuitry of the Bit Clock Generators. Basically, there are two steps we have taken to minimize component use. First, we have moved to a system whereby a single set of Bit Clock Generators is used to clock out both the light-bar (LB) and darkbar (DB) modules of label data. Second, we have invented a method to re-use the BCG as often as necessary when we clock out multiple bit-widths during a module, thereby eliminating the need for using four separate Bit Clock Generators for each data state. These changes have allowed us to build the Asynchronous to Synchronous Converter with only two Bit Clock Generators instead of eight, using one BCG to clock out the first bit of each module, and the other BCG to clock out the second, third and fourth bits.

We are able to use the single set of Bit Clock Generators as shown in FIGS. 6 and 7 for both dark-bar and light-bar information by multiplexing the appropriate K-value into the BCG comparators. Referring to FIG. 6, we can see that the select inputs on the multiplexers E2 and A5 are controlled directly by the Q DATA line. If Q DATA is high, meaning that we are clocking a dark bar, the DK inputs (K value for DB from measurement circuit) will be selected, while if Q DATA is low, the LK inputs (K value for LB from measurement circuit) will be selected. The outputs of these multiplexers feed one side of the comparators in BCG 1. At the beginning of each data module, we briefly shut off the Bit Clock Generators with 150 ns one-shots, during which time the K-values are selected.

We base our selection of the K-value for the second BCG, which is shown in FIG. 7, upon which K-value, either light bar or dark bar, has been updated most recently. This K-value, which we call K″, is actually an averaged value obtained from the inkspread circuitry, which will be discussed elsewhere. While we must use a K-value in BCG 1 which corresponds to the data state which we are clocking, the K″ value, which is used for clocking out the second, third and fourth bits during a module, is interchangeable, meaning that light bar information may be used for clocking out dark bars, and vice versa. For this reason, we can select that information which has most recently been acquired, and which therefore will be most accurate as to the bar-width measurement. This selection function may be observed in FIG. 7, where it is seen that multiplexers D4 and E1 are controlled by the signal from the RS flip-flop. The state of the RS is controlled by the signals D LATE and L LATE, which are generated in the updating circuitry in the Count and Latch. If we update on a light bar, we get an L LATE signal, which tells the multiplexers to select the LK information, or if we update on a dark bar, we will select the DK information. Thus by selecting the particular K-value information which we will need to produce the output clock, we can use the same Bit Clock Generators for clocking out both light bar and dark bar modules.

The second improvement which we have made for reasons of economy deals with recycling the second BCG, in order to use this same BCG for clocking out the second, third and fourth bits of a module. This is in contrast to the prototype system, where we used a separate BCG to clock out each bit. Referring to FIG. 8, we see that this is accomplished fairly simply by taking advantage of the way comparators E4 and E2 operate. First, BCG 2 is turned on when BCG 1 produces an output and latches itself into an "on" condition. Then, when the count at the B inputs of the comparators of BCG 2 exceeds the K"-value at the A inputs, a high output at pin 7 of E2 is generated. This output goes through several gates, meant to eliminate noise spikes and spurious outputs, and is used to trigger the output one-shot J5. This signal at the input of J5, while triggering the output clock, is also fed to the Load and Clear (Reset) inputs of counters F4 and E3, forcing the output of the counters to a low value. This low value at the B inputs of the comparators will be less than the K-value at the A inputs, and the output at pin 7 of E2 will be forced back low. This releases the Load and Clear inputs to the counters, allowing them to once again clock up to the K-value, which will again force the output of E2 high, and cause another output clock. The second BCG will continue to cycle in such a manner until the end of the data module, at which time BCG 1 will be reset and "unlatched," which turns off BCG 2 until such time as we obtain another output from BCG 1. Note that we also employ a counter, K5, in the output circuit of BCG 2, which shuts off the output after the maximum legal fourth bit is clocked out during a module.

There are several changes which we have made in the Bit Clock Generators in order to improve the accuracy of the A/S converter. These changes have been made in four areas:

1. The use of a proper K-value in BCG 1.
2. The use of a preset at the counters to make up for system delays and inkspread.
3. Artificial generation of an output clock pulse if none has been triggered during a data module.
4. A failsafe circuit to prevent spurious outputs from BCG 2.

In the BCG system as it was originally envisioned, the K-value inputted to the comparator of BCG 1 was fixed at a binary 5, while only the Bit Clock Generators responsible for the second, third and fourth output clocks received a true variable K-value from the Count and Latch circuits. As the prototype system was developed, however, it became obvious that this method failed to generate output clock pulses at that correct location in the data module which would give maximum allowance for system error. Consider, for example, the output clocks in relation to a stream of data such as shown in FIG. 1.

The first clock during the module is always generated at K=5, while any remaining clocks are spaced out by the K-value stored in the Count and Latch circuits. Consider what would happen if the fourth module, containing three zeros, were stretched out slightly either by printing or system error as shown in FIG. 2. The three zeros have been clocked out as four bits, even though the error in the system has been small. This is because the output clocks have not been placed in the middle of the imaginary "bits" in the module, but rather at the leading edge of each bit. Thus, while the last bit of each module may contract a great deal before losing an output clock, it can expand only a small amount before a spurious clock is injected. To get maximum tolerance for random error, the output clocks should be placed directly in the center of the data bits as shown in FIG. 3.

We see from this example that in order for this clock placement to be accomplished, the first clock should be generated at a time equal to ½ K-value into the module. Then if the remaining clocks are spaced by the K-value, the last clock during a module will automatically be ½ K-value from the end, leaving us maximum tolerance for random error. (This concept is modified slightly when we have systematic, or inkspread error, which we will discuss later).

The method which we use for setting up this first output clock at ½ K is quite straightforward. The inputs to the comparators in BCG 1 are selected by multiplexers which select either a DK value for a DB module or an LK value for an LB module. To get from a K-value to ½ K-value, we drop the least significant digit, as indicated in FIG. 6 and input the multiplexers with the binary value which remains, which will be one-half the original value.

The obvious flaw in using a variable K-value in BCG 1 is that for the first few modules of information that are inputted to the A/S, there will be no stored K-value. These modules would necessarily be one-bits, as part of either the guard-bars or center-bar, which must precede label information. What we do, then, is to treat the first three modules as one-bits only, keeping the second BCG turned off until we have stored the K-values from these first modules. The clock placement then becomes irrelevant, since we will be generating no erroneous clocks from BCG 2.

We implement this function for the first three data modules by use of the ALU TRANSFER CIRCUIT, shown in FIG. 9. This circuit is comprised of three R-S latches FF1, FF2, and FF3, which are kept in a prelabel reset condition by the A/S noise-eliminating circuits. Until all three latches have been set, BCG 2 is kept turned off by the output of FF3. Similarly, the multiplexers which select the K-value for BCG 1 are kept turned off, meaning that a K-value of zero will be sent to the comparators. Since this K-value is zero, an output clock will be generated immediately as BCG 1 is turned on, which is approximately 150 ns after the leading edge of the module. (This turn on is controlled by LBOS and DBOS at H1 pin 10. These 150 ns one-shots are generated at the beginning of the data modules, and are used for a variety of functions in the A/S). Before the ALU TRANSFER CIRCUIT will allow the Bit Clock Generators to free run, it must see, in order, a DB one-bit, an LB one-bit, and another DB one-bit. Any reset generated by an invalid bit will cause the circuit to start over again. After this original 1-0-1 has been clocked out, proper K-values will have been stored, so the multiplexer which sends ½ K to BCG 1 is turned on, and BCG 2 is turned on as well.

We will now refer to FIG. 10 and discuss the second changes in the Bit Clock Generator system made for the sake of improving the A/S accuracy. This has to do with "fine tuning" the system and makes use of the data strobe (preset) inputs to the counters in the Bit Clock Generators. The counters which we use have parallel strobed entry capability, meaning that if the strobe input to the counters is activated, the clock will be overridden, and the binary value at the data inputs will be transferred to the output. When the strobe is released, the counters will be clocked again in the normal manner, with the count being added to that value which was strobed in. If, for example, we strobe in a binary ten (1010), the first clock edge after the strobe is reseased will cause the output to go to eleven (1011).

In the first A/S converter, these strobe inputs were used solely to perform a latching function. Since four Bit Clock Generators were used in cascade for both light bar and dark bar modules, when the first BCG would produce an output clock, it would also turn on the second BCG. At the proper time, the second BCG would produce an output clock, at the same time turning on the third BCG, and so forth. Since each BCG was used to turn on the following BCG, some method had to be used for keeping the output in an "on" state until the end of the module. If this were not so, the counters in the BCG would continue counting past the point which caused the output of the comparators to go "true," and up to the point where the counters would overflow and return to zero, turning the comparator outputs off, which would therefore prematurely turn off all the Bit Clock Generators down the line. To prevent this occurance, when the comparators reached the point where the output of the counters equalled the K-value, the comparator outputs were used to strobe the K-value into the data (preset) inputs of the counters. This would cause the clock to the counters to be over-riden, and transfer the K-value to the output of the counters, which is the input to one side of the comparators. Since there would now be the identical K-value at both sides of the comparators, the A=B output of the comparators would remain "true" until the counters were reset at the end of the module. Therefore, the A=B output, which was used to trigger the output clock of the A/S, was also latched "on," and could be used to turn on the next down the line.

As the A/S was perfected, it became desirable to make some fine adjustments in the placement of the output clocks, shifting them by increments as small as 50 ns in order to compensate for delays and inaccuracies in the system. The easiest place to do this was at the strobe inputs to the counters, since the counters can be "preset" at the beginning of a module to a certain number, which will reduce the amount of real time it takes for the counters to clock up to the K-value. At the same time, it was necessary to preserve the latching function, for although the number of Bit Clock Generators was reduced to two, BCG 1 is still used to turn on BCG 2 at the time when BCG 1 triggers an output clock. BCG 2 does not latch itself "on," as it recycles, producing a continuous stream of output clocks, spaced out by the K-value.

Since the preset inputs of the counters were to be used to "fine tune" the system, we could no longer use the K-value at these inputs to provide the latching function. Since each BCG uses two counters in cascade, we were able to use the first counter, which provides the least significant digits, from one to fifteen, to preset the system. In BCG 1, we control this preset by use of a ROM. For a nominal label, with no printing error, this ROM presets the counter at a binary five. Depending on the amount of inkspread in the label, the ROM can vary the preset down to zero or up to ten. (Exactly how this variable preset is determined will be discussed at length in the section covering the inkspread correction system). The first counter in BCG 2 is preset by a fixed value of two every time this BCG cycles. These nominal preset values, five for BCG 1, and two for BCG 2, were arrived at experimentally as being the best values to effect optimum output clock placement.

In order to preserve the latching function in BCG 1, we modify slightly the idea of strobing the K-value into the counters at the time the A=B comparator output goes "true." Instead of strobing both counters in the BCG with the comparator output, we strobe only the counter which is used for the most significant digits, which would be 16 to 256. Instead of using the K-value at the strobe inputs, we merely strobe in all "ones," and instead of using the A=B comparator output to control the strobe, we use B>A. This means that when the counter output becomes one count higher than the K-value, the B>A output of comparator F2 goes high, strobing in a high number (256-16=240) into the upper counter. This number will be transferred to the counter output, which is the "B" input of the comparator, and since this number is most assuredly greater than the K-value at the "A" input, the B>A output will be latched "on," turning BCG 2 on until we reach the end of the data module. At this time, a brief reset pulse is generated by LBOS+DBOS at H1 pin 10, which overrides the strobe input, causing the B>A comparator output to fall back to zero.

Another improvement which we made in the Bit Clock Generator system in order to improve the A/S accuracy was to add a mechanism which artificially inserts an output clock whenever the A/S passes a data module without generating a clock in the BCG. To see how this incident could occur, consider the example of FIG. 4.

Some type of graphics in front of the label, such as a number system identifier, has fooled the A/S into thinking it has seen a valid guard bar. When the label data itself arrives at the A/S, there is a K-value stored from these graphics that is so large that the BCG 1 counters do not reach this value (or half this value, as the case may be). Consequently, there is no Bit Clock Generator output, and the first two characters of the guard bar are not clocked into the Digital Processor. This means, of course, that the label cannot be decoded.

What we have to look for, then, is the absence of an output clock during any given data module. This is done by the use of two R-S latches FF5 and FF6. At the beginning of each LB module, we generate LBOS, a 150 ns pulse. This is used to set one latch FF5. The other latch FF6 is set by DBOS. Once a latch has been set at the beginning of a module, it will generally be reset before the end of the module by an output from BCG 1. Suppose, however, that we enter a DB module, meaning that the DBOS has set its latch FF6, but that we get no output during the module to reset the latch. In this case, the output of the latch has energized one input of a two-input and-gate. At the end of the DB module, LBOS will be generated, as an LB module is beginning. This LBOS is connected to the other input of the and-gate, H3, and since the latch has not been reset, this LBOS pulse will be gated through the A/S output circuit as if it were an actual BCG 1 output clock. Similarly, if BCG 1 fails to clock an LB module, the DBOS at the end of this module will be gated out through H4 as an output clock.

There is, of course, one small problem with this mechanism, as the A/S output clock occurs after the particular data module has passed through the system, and the clock will arrive at the Digital Processor during the wrong module. Our solution to this is to delay slightly the data (not the clock) which is sent to the Digital Processor. This is done by use of a flip-flop at the input of the A/S which is clocked by the master clock and is connected as a shift register. The data which is seen at the A/S input is shifted by three clock pulses by this flip-flop before it is sent to the Digital Processor. This corresponds to a lag of 150 ns, which is plenty of time to insert an artificial clock pulse and to insure that it reaches the Digital Processor during the correct data module. Thus, with our improved system, the data and A/S clocks would appear as shown in FIG. 5.

We made one more small modification in the BCG system in order to insure its reliability. This is the addition of a failsafe circuit, as shown in FIG. 12, which disallows any output from BCG 2 until 400 ns after an output from BCG 1. The circuit is implemented by use of the one-shot J4, which is triggered by the BCG 1 output, and gates out any output from comparator E2 for the prescribed amount of time. The circuit prevents any spurious outputs from BCG 2 which might be due to noise or the shifting of K-values at the comparator inputs. The 400 ns figure was chosen because this is slightly below the minimum bit-width of label information, and so any output generated in less than this time would be illegal.

The impetus for redesigning the Count and Latch circuits came from the necessity for dealing with the great latitude in systematic label error, which we call inkspread, that is allowed by the UPC Specification. The original design called for measurement information, the K-value, to be interchanged between the high-level and low-level measurement systems at anytime a current data module was two-bits or more wide. The inkspread problem demanded that we keep dark-bar and light-bar information separated, in order that it could be properly processed in order to compensate for the inkspread. This led to our first major Count and Latch design change: the functional separation of the low-level and high-level measurement systems. The other major conceptual change in the Count and Latch which we will discuss in this section deals with the fact that we expanded the C & L to update on two-bit and four-bit modules whenever possible, and reduced our reliance on the one-bit modules whenever the basic bit-width became so small as to be greatly affected by random label and system errors.

We will first examine the rationale behind the prototype Count and Latch system, in order to understand how it could be modified to meet our needs. As is the case in the current system, there were two Count and Latch circuits, one for light-bar data and one for dark bar-data. It was deemed necessary that the latches should update as often as possible in order to track the data. This is because the data in the system changes length continuously in real time, due to the type of scan pattern used and from the necessity to read labels printed on curved surfaces. It was also the function of these circuits to update on one-bit modules only.

From these two considerations evolved the concept of cross-strobing information between the two measurement systems. Assume that we are clocking out a label, and have just stored information from a light-bar one-bit and a dark-bar one-bit, and are in the process of clocking a light-bar three-bit. At the end of the three-bit, there will be no update, and the next dark-bar will be clocked from information that is already three modules old, in the absence of any other input (remember that the low-level measurement system holds the K-value for the dark-bar BCG, and vice versa.) This situation would look like that shown in FIG. 13 in the absence of cross-strobing. However, by storing the dark-bar K-value in the light-bar latch at the end of module three, we can clock module four from the more recently updated module two. Thus, the solution arose to cross-strobe, that is, to enter data in the low-level latches that had been stored on the high-level latches, and vice versa. Also, by strobing in data in lieu of an update, we satisfied the criterion for updating on only one-bit modules, as the strobe was used to override the count which accumulated during those modules over one-bit wide.

While there was nothing wrong with this system in theory, the practical realities of the UPC label made it unworkable. The label specifications are such that dark-bar one-bit modules may be twice or more the width of light-bar one-bit modules, and vice versa, meaning that the K-value information from one Count and Latch could not reliably be used to clock out modules from the opposite data state. In fact, both low-level and high-level information would have to be used in an averaged manner in order to derive an accurate bit-width measurement. In order to keep this low-level and high-level information separate, as it must be for processing, cross-strobing had to be eliminated. This led to the following concept for the Count and Latch Circuits shown in FIG. 14.

Of course, in this intermediate system, it was still necessary to update on only one-bit modules. To accomplish this, we inserted one-shots, RS flip-flops and gates, to arrive at the circuit of FIG. 15.

DBOS and LBOS are monostable multivibrators (one-shots) which generate a short (150 ns) pulse at the beginning of each respective data state. To trace the circuit action, we will assume that we are just entering a dark-bar module. At this time, DBOS is triggered, and sets the R-S flip-flop with the 150 ns pulse. At the same time, the DB counter is turned on. Note that we retain the use of the pulse stretcher at the counter reset. This pulse stretcher is comprised of a shift register and an and-gate, and assures that the counter will not be reset before the latch has time to store the K-value.

At the same time, this module is being clocked out by the Bit Clock Generators, and if the module is two-bits or more wide, the signal DB "2" will be generated. This will reset the R-S and disenable the and-gate at its output. If no DB "2" signal occurs, the and-gate will remain activated at the end of the module. Then LBOS, which occurs at the end of each dark-bar module (which is the beginning of each light-bar module), will be gated through the and-gate. The resultant signal is used to clock the DB latch, storing the binary information present at the output of the counter. This binary information becomes our K-value, the measurement of the basic bit-width of the label. The LB Count and Latch circuit works just the same, except that it operates on data of the opposite polarity.

A simplified timing diagram of the Count and Latch circuits in relation to a stream of data would be as shown in FIG. 16.

Even though cross-strobing is eliminated in the Count and Latch circuits, we have preserved the concept of clocking out the data with the most recent information. The process is controlled now by the multiplexer between the Arithmetic Logic Unit and the second Bit Clock Generator. If a dark-bar is updated, a DLATE signal is generated, and tells the multiplexer to select the DK" value. This is the DK value which has been corrected by our inkspread circuit. Similarly, if a light-bar is updated most recently, LK information is selected for the second BCG. As we shall see in our discussion of the ALU, DK information is always used in BCG 1 for clocking out the first bit of a dark bar module, and LK information is always used to clock out the first bit of a light bar.

As the Asynchronous to Synchronous Converter evolved, we expanded the Count and Latch circuits in order to obtain greater accuracy in measuring label data. While the basic circuit of FIG. 15 is retained, we added an extra latch, in which we store information from not only one-bit modules, but two- and four-bit modules as well. The information in these secondary latches, which we call the K*-value, is used by the second Bit Clock Generator, after having been modified in the Arithmetic Logic Unit. The information in the primary latches, our K-value, is used by the first Bit Clock Generator, and in the ALU to compute the inkspread correction factor. A simplified diagram of the current Count and Latch circuit for either LB or DB data is shown in FIG. 17.

Of course, in order for BCG 2 to clock out the data, it needs a K-value input which measures out one bit at a time, not two or four bits. For this reason, we use a divider circuit between the ALU and BCG 2. The dividers are actually two multiplexers in cascade. The first multiplexer selects either the corrected K* value or ½ that value. The output of this multiplexer is fed into a second multiplexer, which selects either the full input value or ½ this value. Depending upon the selection, then, the output of the second multiplexer can be either 1, ½, or ¼ of the corrected K* value. The selection is controlled by R-S flip-flops, which "remember" if the update took place on a one-bit, two-bit or four-bit. The output of the dividers is called our K** value (sometimes refferred to as the K''value.) There is a selection memory for both the LK* and the DK* values. A block diagram of the DK side of the system is shown in FIG. 18.

The reason why we do not update on three-bits as well as on one-, two-, and four-bits is that the division process in binary is much easier when working with even multiples.

This greater frequency of updating gives us more latitude in selecting that measurement information which we want to use. Specifically, it was decided that we should reject one-bit information when the basic bit-width becomes so small as to be greatly affected by random printing and system error. This protects against the following situation where different label magnifications are affected by the same absolute amount of printing error as shown in FIG. 19.

The times-1 label, which has about the same "ripple" at the edges of the printed bar as the times-2 label, actually has twice the percentage of error per bit. This means that there is going to be relatively twice the error in the K-values presented to the Bit Clock Generators. Also, there is a fairly constant amount of random error in the measurement circuits, due to the relative coarseness of the master clock. The smaller the bit-width, the more significant this error becomes.

The solution which we have adopted to this problem is to prevent the secondary latches from updating on one-bits for bit-widths that are below a certain cutoff value. This cutoff is approximately for times-1 values and below. We always update the primary latches on one-bits, regardless of the error, for one-bit measurements are necessary to obtain inkspread information for the ALU and in order to obtain the K-values for BCG 1. The cutoff is superceded when we are clocking out the first three one-bits of information (the guard bar) or when we have an XTRACLK (extra clock) generated. This is necessitated because we have to store at least some reasonably accurate information in order to clock out the first modules received after the guard-bar. Then, once a two-bit or four-bit module is clocked out, this first approximation can be replaced with a more accurate value. Logically, then, the decision as to whether to update is made as shown in FIG. 20.

Thus, by use of two-bit and four-bit modules in updating our measurement systems, we are not only able to improve "tracking" of the label data, through more frequent updates, but we can reduce the significance of random noise as well, giving us a more accurate and useful K-value.

The Arithmetic Logic Unit was added to the Asynchronous to Synchronous converter as a mechanism to compensate for systematic label error, which is manifested as inkspread or inkshrink in the UPC label. Functionally, the ALU is located between the Count and Latch circuits and the Bit Clock Generators. Its purpose is first to calculate the amount of ink-spread from measured one-bit modules. The ALU then uses this calculation in two ways in order to insure correct placement of the A/S output clock. First, in BCG 1, the counter preset is varied by a Read Only Memory in accordance with the amount of inkspread or inkshrink in the system. This will affect the placement of the first clock in the module. Second, the K*-value, which is used in BCG 2, is modified by the inkspread information in order to get that K-value which is an accurate measurement of the nominal bit-width.

Let us look at the data from a "perfect" label, in comparison with a label which has been affected by inkspread, in order to see the errors in the output clock which would occur in an uncorrected system as shown in FIG. 21.

As we see, module five is clocked out erroneously as a four-bit from the too-small K-value of module four. When we update on module five, its measurement is then divided by four instead of two. This leads to module six being clocked out as a four-bit. Of course, an error of only one clock during an entire half-label will invalidate the reading, so the inkspread has created a serious problem.

Fortunately, through the use of the Arithmetic Logic Unit, we can, at least in theory, totally compensate for inkspread or inkshrink in the system. The system was formulated with two basic premises in mind: (1) That each module be clocked out as the proper number of bits, and (2) That the last clock in each module be located as closely as possible to one-half the nominal K-value from the end of the module. The reason for our first premise is obvious, as we want to clock the data out correctly. The reason for our second premise is that we want to maintain maximum immunity from random error in the system. Random error is the real culprit in the misclocking of labels. It is generated by label misprints, in the video detection equipment, and in the Asynchronous to Synchronous Converter itself. While we cannot prevent much of this error, we can at least allow for it. By placing the clocks one-half the K- value from the end of the module, the module can expand randomly up to 50% of this nominal value before an erroneous clock is generated. Similarly, the module can randomly contract up to 50% of the K**-value before we lose an output clock. Therefore, correct clock placement is critical for maximum random error tolerance.

We will first examine that part of the system which generates the corrected K**-value from the raw K- and K*-values which are held in the latches of the measurement circuits. A definition of the K**-value might be that it is the nominal bit-width, that is, the bit-width of a one-bit module that has been unaffected by inkspread. Now, for purposes of processing the label data, we can presume, as it is just the module edges that are affected by inkspread, that it is only the one-bit measurements that are changed, and that the nominal bit-widths within the modules are unchanged. Consider the following example, where the nominal bit-width has a K-value of 32 as shown in FIG. 22.

In the inkspread label, module four has a width equal to an LB one-bit, which has a value of 16, plus two nominal bit-widths, for a sum of 80. Module five is the sum of a DB one-bit, or 48, plus one nominal bit-width, which equals 80. Similarly, for the inkshrink label, module four is the sum of one LB one-bit plus two nominal bits, and module five is the sum of the DB one-bit plus one nominal bit. This all means that if we correctly place the first clock in a module, then the second, third and fourth bits may be clocked out by the nominal bit-width, regardless of whether we are clocking an LB or a DB module, and regardless of the bit-width of the module.

In a perfect label, this nominal bit-width is automatically stored, but in a label with systematic label error, neither the light-bars nor the dark-bars will be of nominal width. Referring to FIG. 22B, we see the DB one-bits have a K-value of 48, while the LB K-value is 16. The actual nominal value is 32, which is the average of the two. We find it useful in our system not to compute the average directly, but to determine the amount of inkspread in the system and to add or subtract this inkspread from the LB or DB modules in order to arrive at the nominal K-value.

Assume that we have a case of inkspread, in which case the DB modules are increased by the inkspread I, and the LB modules are decreased by I. Algebraically, we can express these K-values as $DK_{nom} + I$ and $LK_{nom} - I$. Now, if the two modules are the same bit-width, i.e. one, two, three or four, then we can calculate the inkspread from the following formulas:

$$\frac{DK_{nom}+I}{-LK_{nom}-I} \text{ or } \frac{DB}{-LB} \quad \frac{2I}{2} = I$$

By subtracting the LB K-value from the DB K-value, and dividing the difference by two, we arrive at the inkspread, I. If we add I to an LB, or subtract I from a DB, we arrive at the nominal K-valve, If the situation is one of inkshrink, then I will be a negative number, but the system still works correctly, as we will be subtracting a negative number from the smaller DB, thereby increasing its value, and adding a negative number to the larger LB, which will make it the smaller, nominal value.

In the Arithmetic Logic Unit, for reasons of chip-economy, we subtract only LB one-bits from DB one-bits. We can then test our inkspread formula empirically by subtracting the LB one-bits of FIG. 22B from the DB one-bits, and then calculating the nominal K-value:

$$\frac{DK}{-LK} = \frac{48}{-16} \quad \frac{DK}{-I} = \frac{48}{-16} \quad \frac{LK}{+I} = \frac{16}{\pm 16}$$
$$\frac{32}{2} = 16 = I \qquad \frac{}{32} = nom \qquad \frac{}{32} = nom$$

The inkspread has a value of 16, as we observe from our data. We can arrive at the nominal value of 32 either by subtracting from the DK value or by adding to the LK value. If we have inkshrind, as in FIG 22C, then the formula will work out as follows:

$$\frac{DK}{-LK} = \frac{16}{-48} \quad \frac{DK}{-I} = \frac{16}{-(-16)}$$
$$\frac{-32}{2} = -16 = I \qquad \frac{}{32} = nom$$

$$\frac{LK}{+I} = \frac{48}{+(-16)}$$
$$\frac{}{32} = nom$$

Therefore, whether we have inkspread or inkshrink, we calculate the correct nominal value.

As we have said, we use only DB one-bit modules for purposes of calculating the inkspread, I. In order to obtain the most accurate value of I, we require that these one-bits occur in order in the label data, without any interceding two-, three-, or four-bits. This assures that no modulation of bit-widths will occur, the presence of which would give us a misinterpretation of the inkspread. For example, we would calculate inkspread at points A and B of the following data as shown in FIG. 23.

In order to implement this function, we use a latch to store the inkspread value, and clock this latch only when two one-bits are in juxtaposition. The latch is clocked by a one-shot, and the one-shot is triggered by the output of a divide-by-two counter. If the counter is clocked twice in a row by the LB "1" and the DB "1" signals, it will trigger the one-shot. If a module is clocked out as two-bits or more wide, the counter will be reset, and there will be no inkspread update. Schematically, the system is shown in FIG. 24.

Once that this I value is stored in the latch, it is added to the DK*-value and subtracted from the LK*-value in order to obtain the corrected K-value used in the second Bit Clock Generator. This K value may be chosen from either the DK* operation or the LK* operation. As we discussed in the section on the Count and Latch circuits, the K*-values may be updated from either one-bit, two-bit, or four-bit midules. This will not disturb our calculations, as we can see by developing a formula to express the module width. Assume we have a case of inkspread, and have updated on an LB two-bit module in the C & L circuit. We can express this LB as the sum of two LK nominal values, minus the amount of the inkspread. If we now add the inkspread gack in, as is done in the system, we get the following equations:

$(LK_{nom} + LK_{nom} - I) + I = 2LK_{nom}$ or $LB_{2BIT} + I = 2LK_{nom}$ or $LK^* + I = 2LK_{nom}$ We can then derive the nominal bit width for BCG 2 by simply dividing $2LK_{nom}$ by 2. Similarly, if we had updated on a DB two-bit, we would first subtract the inkspread from DK*, then divide by two, in order to arrive at the DK**-value. Of course, the system works as well for one-bit or four-bit K* values, in which case the only change is to divide the corrected K* value by one or four in order to calculate K**.

As we have seen from our calculations, it is possible to use either DK or LK as a definition of our nominal bit-width. One final step, then, after calculating DK and LK in the ALU is to select which of these values will be used by BCG 2. As was discussed in the C & L section, we generate a DLATE signal when updating a DK*-value and an LLATE signal when updating LK*. An LLATE signal tells the multiplexer which follows the divider network to send the LK-value to BCG 2, and a DLATE signal selects the DK-value. This assures that the information which has been most recently updated is used in clocking out the data module.

In summary, then, we can say that there are four distinct steps in arriving at the nominal K**-value used by BCG 2:

1. Derive I from the DK and LK one-bit values.
2. Add I to LK*; subtract I from DK*.
3. Divide corrected K*-values as required.
4. Select the most recently updated K**-value for use in BCG 2.

In simplified block diagram form, the system is shown in FIG. 25.

By use of the proper K-value, we can maintain accurate spacing between the output clocks, We have mentioned one other consideration to be taken into account in order to assure proper clocking of the data module. In order to achieve maximum error immunity, the last clock must fall, under mean label conditions, one-half of the nominal (K) bit-width from the module edge. Simply using ½ K-value to clock out the first bit and using the nominal bit-width to clock out ensuing bits does not accomplish this.

We can understand this by taking a case of inkshrink, for example. Here, the LB one-bits are wider than nominal size. If the output clock is generated in the middle of the module by using one-half of the LK-value, the clock will be farther than one-half the nominal bit-width from the lagging edge of the module. The clock in the smaller DB one-bit modules, falling in the middle of the bit, will always be less than one-half the nominal bit-width from the end of the module. Now, the two-, three-, and four-bit modules are merely one-bits extended by multiples of the nominal bit-width. This means that an error in placement of the first clock will cause each subsequent clock to differ from our standard, 50% nominal bit-width from the module end, by the same factor. This factor is equal to one-half the inkspread, I.

In the example of FIG. 26 are shown the errors which arise in clocking both inkshrink and inkspread labels when the first clock is uncorrected.

There are actually four possibilities for error which arise. Since we are clocking both light bars and dark bars, under conditions of both inkspread and inkshrink, we have:

Inkshrink × LB — output clocks too early
Inkshrink × DB — output clocks too late
Inkspread × LB — output clocks too late
Inkspread × DB — output clocks too early One way to correct this problem would be to add or subtract the error of ½I from the LK and DK values, as we similarly did to the LK* and DK* values. Due to the range of values in using only half the inkspread value, we have arrived at a more economical solution of manipulating the preset of the counter in BCG 1 by use of a single Read Only Memory. The ROM presets the counter to a nominal value of five, which is that value which compensates for the various delays built up in the system and assures optimum clock placement for labels with no systematic printing error. If there is a case where the output clocks will occur too late, such as for an LB of an inkspread label, the clocks can be made to shift away from the end of the module by increasing this preset value. If we increase the value by ½I, then the counter will count up to the K-value ½I faster, and the clocks for the LB modules will occur ½I earlier. As a result, the last clock will occur 50% of the nominal bit-width from the end of the module.

This clock shifting mechanism also will subtract from the preset, down to a preset of zero, when it is desired to effect the output clocks later. For the four possible error situations are given the four necessary solutions:

Inkshrink × LB = subtract from preset
Inkshrink × DB = add to preset
Inkspread × LB = add to preset
Inkspread × DB = subtract from preset In order to make these decisions, the PROM has inputs of the inkspread data and of QDATA. The inkspread information will denote whether it is positive or negative, i.e., inkspread or inkshrink, and the state of QDATA denotes whether we are clocking an LB or a DB. The output of the PROM is connected directly to the counter preset.

By use of this preset system in BCG 1, and use of the corrected K**-value in BCG 2, the Asynchronous to synchronous converter can then tolerate truly random error in the scanning system of up to 50% bit-width. The possibility for correcting systematic error is limited only by the resolving power of the mechanism itself.

The ALU Transfer Circuit is the mechanism which keeps the second Bit Clock Generator turned off, and makes the first Bit Clock Generator clock at a preset time, until the Asynchronous to Synchronous Converter has received three continuous valid one-bits in a row, such as from a guard bar or a center bar of the UPC label. The function of the A/S Digital Noise Rejection Circuitry is to maintain this transfer circuit in a reset condition prior to the actual label, thus assuring that any noise impulses happening in front of the label do not turn on BCG 2 prematurely, and cause it to clock from erroneous K-values. A second function of the Digital Noise Rejection Circuitry, which is synonymous with the Reset Circuitry, is to keep the registers in the Digital Processor clear of noise, preventing an accumulation, which might cause a label misread.

There are three separate reset circuits in the A/S which serve to discriminate against noise. These are the "128 Reset," which defines the maximum legal one-bit width; the "φ Reset," which defines the minimum nominal bit-width; and the "6 Reset," which rejects modules which contain greater than the maximum legal number of bits.

We will first examine a situation in which the "128 Reset" is necessary to insure correct A/S operation. Digital noise in the data stream may arise from many sources, such as dust on the glass, dirt on the label, or any kind of graphics on the package label. Suppose, for example, that we have some type of printing on the package that is in close proximity to the UPC label. This printing might cause QDATA to go high in front of the label itself, and confuse the ALU Transfer Circuit into thinking that three valid one-bits have occurred as shown in FIG. 27.

The ALU XFER signal has been triggered into an "on" condition by the noise, allowing the A/S to free-run, and to clock out the actual data on the basis of K-values which will be erroneous. In addition, the noise will be entered into the Digital Processor registers as information, and may cause a fictitious number to be decoded. One way in which we can prevent this occurance is to set an upper limit on the width of a valid one-bit, which is exactly what the "128 Reset" does. The figure "128" refers to that K-value which is the maximum legal size for a one-bit in our system. This value of "128" corresponds to a real time of 6.5 microseconds, which is beyond the approximate 5.5 microsecond one-bit width for a maximum-size UPC label. The "128 Reset" is activated for the first three modules of information only. If and only if these three modules are passed as valid, the "128 Reset" will be locked out for the duration of the label. This insures that a reset will not be generated accidentally, during one of the longer two-, three-, or four-bit modules. In our example, FIG. 27, a "128 Reset" would be generated during the long module, 3, and the ALU Transfer Circuit would have reset at this time and waited for a valid DB one-bit to restart its cycle.

The occurance of high frequency digital noise, of a very small K-value, can disturb the clocking function of the second Bit Clock Generator. This is because the A/S output clock is of finite duration, on the order of 150 ns, and if the K-value is so small as to generate clocks in less time than this, the clock will never return to its inactivated state. It will go "low," and stay low, presenting no useful clocks to the Digital Processor. Of course, this small a K-value will be noise, and even if it does get clocked into the DP, it will be spurious information. In order to distinguish this high-frequency noise, we have built a comparator into BCG 2, which looks at the K-value at the time of each BCG 2 output. If the K-value is less than a decimal 8 at this time, a "0" Reset will be generated, resetting the ALU Transfer Circuit in the same manner as does the "128" Reset. This will turn BCG 2 off, and force a reevaluation of the K-value before the system is again allowed to free run. This K** cutoff value of 7 or less corresponds to a bit-width of 350 ns, meaning that it is below minimum legal size for the system.

On many packages, there is a great deal of printing which might closely approximate the characteristics of a UPC guard-bar. Any of these graphics might set the ALU XFER "True," clock a great deal of noise into the DP, and confuse the A/S when an actual label is encountered. For instance, the following burst of noise in front of a label would cause the A/S to clock out each character in the guard-bar as a two-bit as shown in FIG. 28.

To prevent this type of situation from occuring, we have installed a mechanism called the "6 Reset" into the Asynchronous to Synchronous converter. The "6" designation refers to the fact that we generate a RESET at any time a data module is clocked out as a six-bit. Actually, any character five bits wide or larger is illegal, but by allowing up to six bits per module, we insure that some small random error does not generate an unnecessary RESET. In FIG. 28, a RESET would occur at point A, resetting XFER, and allowing the guard bar to be clocked out as one-bits only. Note that only four clocks are present in the A/S output, as this is the maximum module width which we want to clock, whether or not the module is legal. At the count of four-bits, the output is turned off, but the A/S continues counting the number of bits internally.

The "6 Reset" also performs the function of resetting the A/S after a label has been clocked, and occurs after the laser passes through the end guard bar and scans six "bit-widths" of the white area surrounding the label. In such a case, if the label has been clocked correctly, the Digital Processor will "Acquire" the label and lock out any A/S resets until the label has been decoded.

FIG. 29 shows a simplified block diagram of the functional aspect of the Digital Noise Rejection System.

Any one of the three possible resets will trigger the RESET ONE-SHOT, resetting the Digital Processor and the ALU Transfer Circuit. The Transfer Circuit reset insures that the A/S will clock correctly, and the DP reset, in conjunction with the numerical and parity tests performed by this mechanism, becomes a powerful tool in eliminating misreads of the UPC label.

The embodiments of the present invention in which an exclusive property or privilege is claimed are defined as follows:

1. In a clock pulse generator for producing clock pulses in synchronism with data bits of non-return-to-zero code being transmitted at a variable data rate as a stream of high and low level data pulses each of which represents one or more bits, each data word including a prefix having at least one pulse representing a predetermined number of bits, said generator comprising a master clock, a bit clock system including a first and a second bit clock generator, said first bit clock generator being connected with a source of data pulses and with the master clock for producing a first timing signal when the data pulse has a duration which corresponds to one bit time of a data pulse, said second bit clock generator being connected with the master clock and with the output of the first bit clock generator for producing succeeding timing signals when said data pulse has a duration which exceeds the bit time of a data pulse, and measurement means connected with said source of data pulses for measuring the time duration of the prefix pulses to produce a measurement signal having a value corresponding to the bit time at the existing data rate, and clock signal generating means connected with the first and second bit clock generators and responsive to said timing signals for producing a serial stream of clock pulses in synchronism with the bits of said data pulses, the improvement wherein said first bit clock generator comprises first multiplexing means having first and second inputs, an output and a selector input for selectively connecting the first or second input with said output, said first input being connected with said measurement means for receiving a signal corresponding to one-half bit time of a high level data pulse, said second input being connected with said measurement means for receiving a signal corresponding to one-half bit time of a low level data pulse, first comparator means having first and second inputs adapted to receive signals for value comparison and having an output adapted to produce said first timing signal when the signal applied to said second input exceeds the signal applied to said first input of the first comparator means, the output of said first multiplexing means being connected with said first input of said first comparator means, said selector input of the first multiplexing means being connected with said source of data pulses, and first counting means having an input connected with said master clock and having an output connected with said second input of said first comparator means, and means for starting said first counting means at the initiation of a data pulse whereby said first timing signal is produced one-half bit time after initiation of a high level data pulse or one-half bit time after initiation of a low level data pulse.

2. The invention as defined in claim 1 wherein said second bit clock generator comprises second multiplexing means having first and second inputs, an output and a selector input for selectively connecting the first or second input with said output, said first input being connected with said measurement means for receiving a signal corresponding to one bit time of a high level data pulse, said second input being connected with said measurement means for receiving a signal corresponding to one bit time of a low level data pulse, a second comparator means having first and second inputs adapted to receive signals for value comparison and having an output adapted to produce said succeeding timing signals when the signal applied to said second input of the second comparator exceeds the signal applied to said first input of the second comparator means, the output of said second multiplexing means being connected with said first input of said second comparator means, switch means connected with said measurement means and having an output indicative of whether the latest bit time measurement is for a high level or low level data pulse, the output of said switch means being connected with said selector input of the second multiplexing means, and second counting means having an input connected with said master clock and having an output connected with said second input of the second comparator means, said second counting means having a reset input connected with said first bit clock generator and responsive to said first timing signal for starting said second counting means whereby a successive timing signal is produced one bit time after the occurrence of the first timing signal.

3. The invention as defined in claim 2 wherein the second counting means includes a reset input, the output of said second comparator means being connected with the reset input of said second counting means whereby said second comparator means produces a successive timing signal each time the signal applied to the second input exceeds the signal applied to the first input of the second comparator means.

4. The invention as defined in claim 3 wherein said clock signal generating means comprises a first pulse generator connected with the output of said first comparator means and a second pulse generator connected with the output of said second comparator means, and gate means connected with said pulse generators for producing a serial stream of bit clock pulses.

5. The invention as defined in claim 4 comprising a third counting means having an input connected with the output of said second comparator means, said third counting means having an output connected with said gate means and being adapted to inhibit further output of said gate means when the count of said third counting means reaches a value equal to the maximum allowable number of bit times per data pulse.

6. The invention as defined in claim 5 including logic means connected between said measurement means and said first and second bit clock generators, said logic means being adapted to calculate the amount of systematic error in the bit width of said code, and means connected with said bit clock generators for adjusting the timing of said bit clock pulses to compensate for said error.

7. The invention as defined in claim 6 including means connected with said first and second bit clock generators for detecting a missing clock pulse in said stream of bit clock pulses and means for generating a bit clock pulse to fill the vacancy in said stream of pulses.

8. The invention as defined in claim 7 including a digital noise rejection means connected between the logic means and the second bit clock generator.

* * * * *